United States Patent [19]
Coxon

[11] 3,810,685
[45] May 14, 1974

[54] MANUFACTURE OF TUNGSTEN HALOGEN LAMPS

[75] Inventor: George Eric Coxon, London, England

[73] Assignee: Thorn Electrical Industries Limited, London, England

[22] Filed: Oct. 6, 1971

[21] Appl. No.: 187,130

[30] Foreign Application Priority Data
Oct. 15, 1970  Great Britain .................... 49133/70

[52] U.S. Cl. ...................... 316/20, 313/223, 316/3
[51] Int. Cl. .............................................. H01j 9/38
[58] Field of Search ................... 313/222, 223, 315; 252/181.1; 316/3, 4, 5, 11, 12, 16, 17, 18, 19, 20, 21, 25

[56] References Cited
UNITED STATES PATENTS

| 3,475,649 | 10/1969 | Nameda et al. ..................... 313/223 |
| 3,551,722 | 12/1970 | Holcomb et al. ................ 313/223 X |
| 3,619,701 | 11/1971 | Sugano et al. ...................... 313/222 |
| 3,712,701 | 1/1973 | Johnston et al. ...................... 316/20 |
| 3,738,729 | 6/1973 | Coxon et al. ............................ 316/3 |

FOREIGN PATENTS OR APPLICATIONS
1,007,055  10/1965  Great Britain ..................... 313/223

Primary Examiner—Roy Lake
Assistant Examiner—J. W. Davie
Attorney, Agent, or Firm—Dike, Bronstein, Roberts, Cushman & Robert F. O'Connell

[57] ABSTRACT

The present invention relates to a technique for introducing iodine into a tungsten halogen lamp in the form of a compound which is an involatile solid at room temperature. In accordance with this invention the iodine is introduced in the form of a complex metal or complex ammonium iodide which is dissociated or decomposed by heat. These complexes contain iodine in coordinated complex anions.

4 Claims, No Drawings

MANUFACTURE OF TUNGSTEN HALOGEN LAMPS

The present invention relates to the production of tungsten halogen lamps containing iodine.

Bromine, chlorine, fluorine and compounds containing these have been successfully used as the transport gas in tungsten halogen lamps, but all are chemically more reactive than iodine and can attack the solid tungsten employed for the filament or its supports. These halogens are particularly suitable for high efficacy lamps with filament lives of less than 1000 hours, but in general iodine, an iodine compound or a mixture of halogens with iodine as the main component is necessary for lamps of longer life.

A major difficulty in the use of elemental iodine arises in its introduction into the lamp. It has a vapour pressure which is too high for it to be introduced into the lamp before the lamp is pumped out, and too low for it to be flushed in with the argon or other inert gas fill at room temperature. Cumbersome and expensive techniques have been developed to overcome these difficulties, but have a number of disadvantages. Many of the operations are of necessity manual; introduction of solid iodine is wasteful and liable to the inclusion of harmful impurities such as water vapour; and introduction of iodine vapor gives rise to problems of iodine condensation on parts of the exhaust system, causing blockage and general attack on metal parts and subsequent variation in dosage. As an alternative to elemental iodine, gaseous hydrogen iodide, or a volatile compound that produce hydrogen iodide on dissociation, (e.g. $CH_3I$) has been used. Hydrogen iodide acts as a source of iodine.

The present invention relates to a technique for introducing iodine into a tungsten halogen lamp in the form of a compound which is an involatile solid at room temperature. In accordance with this invention the iodine is introduced in the form of a complex metal or complex ammonium iodide which is dissociated or decomposed by heat. These complexes contain iodine in coordinated complex anions.

Examples of such iodine complexes include $CsAsI_6$, $CsI_3$, $(CH_3)_4NAsI_6$ and $(C_2H_5)_4NAsI_6$. Complexes of this type are soluble in volatile, polar organic liquids such as methyl and ethyl alcohols, acetone and other volatile ketones, ethyl acetate and other volatile esters, and acetonitrile. In the case of arsenic-containing compounds a gettering action of residual impurities is also envisaged.

The iodine compound dissolved in a polar solvent can be accurately dispensed into a lamp and the solvent removed by evacuation or by flushing with a dry non-reactive gas to leave the involatile solid iodine compound. After this the lamp can be evacuated on an exhaust system, which can be a rotary machine of the type commonly used in the manufacture of incandescent lamps, followed by gas filling to the required pressure with an inert gas.

An alternative but less desirable procedure is to use a solution of a mixture of reactants that produce the complex rather than a solution of the complex itself. The solubilities of the individual reactants in a polar organic solvent are enhanced by the eventual formation of the complex in solution. However, in this case it is not possible to purify the complex and excess iodine may cause damage to the exhaust system on evacuating the lamp.

Using the purified complex, however, because the iodine is present solely in the form of an involatile compound at room temperature, the vacuum pumps and system do not require any special protection, and lamps can be processed entirely as normal non-halogen incandescent lamps. The iodine compound is only dissociated when the lamp is heated, which is usually achieved by lighting the filament. The preferred method is to increase the filament voltage slowly from zero to full voltage over about 10–30 seconds to allow the compound to disperse or to "step age" the filament by running at various intermediate voltages from zero to rated voltage. Dissociation of $CsI_3$ and $CsAsI_6$ yields elemental iodine immediately, and is in effect an improved method of introducing iodine as an involatile solid. The compounds $(CH_3)_4NAsI_6$ and $(C_2H_5)_4NAsI_6$ yield hydrogen iodide on dissociation.

The complex iodides may be prepared by developments of established techniques known to those familiar with such complexes. The compounds are conveniently formed by the complexing of iodine molecules with one or two soluble inert metallic iodide carriers in a polar organic liquid.

As an example, caesium hexaiodoarsenate ($CsAsI_6$) is prepared by the reaction:

$$CsI + AsI_3 + I_2 \rightarrow CsAsI_6$$

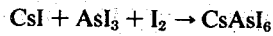

The reactants, in the molecular proportions shown, are refluxed in methyl alcohol (analytical reagent grade) for 40 hours. The solution is filtered and the solvent removed by vacuum distillation. Excess iodine is removed from the solid residue by washing with petroleum ether (b.p. 40°–60°C). The residue is triturated with a small volume of cold absolute ethanol to dissolve the $CsAsI_6$. After filtration the solution is dried over anhydrous magnesium sulphate and cooled at −20°C for 24 hours. Large black iridescent needles separate; yield 6 percent. The compound starts to decompose at 215°C.

The complex ammonium compounds $(CH_3)_4NAsI_6$ (m.p. 113°C, yield 25 percent) and $(C_2H_5)_4NAsI_6$ (m.p. 142°C, yield 53 percent) can be prepared in a corresponding manner using the tetraalkylammonium iodide salts $R_4NI$, such as $(CH_3)_4NI$.

Caesium triiodide $CsI_3$ is prepared by a corresponding reaction of caesium iodide and iodine in distilled water.

The following is one example of the production of a tungsten halogen lamp embodying the present invention.

EXAMPLE

Caesium hexaiodoarsenate ($CsAsI_6$) prepared as above is dissolved in acetone to a concentration of 1.5 percent weight/volume (i.e. 1.5 g. $CsAsI_6$ in 100 ml. of acetone). To maintain a satisfactory transport cycle in a 240V, 500 W coiled-coil linear lamp, having an efficacy of 20 lm/W and 2,000-hour life, 0.2 milliliters of this solution is required.

After the tungsten filament and lead-in wires therefor have been fitted in the lamp envelope, the solution is introduced by inserting the needle of a suitably calibrated syringe into the exhaust tube of the lamp envelope, and injecting the required quantity of solution into the envelope. The solvent is then removed by inserting a hollow needle, connected to a dry nitrogen supply, and flushing gas into the lamp until the solvent is removed.

After this the lamp is processed as a conventional incandescent lamp on suitable exhaust/gasfilling apparatus with the bulb at room temperature. After gas filling, the lamp is then lit to dissociate and disperse the iodine compound. Molecular iodine is immediately liberated and is dispersed throughout the envelope. The inert carrier compound, e.g. CsI, is deposited at the cooler ends of the lamp. The arsenic present in the additive is vaporised and removes residual impurities present in the lamp, for example $O_2$, $H_2O$ and $H_2$. Gettering of $H_2O$ or $O_2$ is also possible by the action of the caesium liberated.

The complex ammonium iodides $(CH_3)_4 NAsI_6$ and $(C_2H_5)_4 NAsI_6$ can be introduced into a lamp in a similar manner. On lighting the filament gaseous hydrogen iodide is liberated in both cases and is dispersed throughout the lamp envelope. The arsenic present acts in a similar manner to $CsAsI_6$, removing residual impurities, for example $O_2$, $H_2O$ and $H_2$.

The following advantages are afforded by the present method when carried out as described above.

A controlled and accurately repeatable dose can be dispensed into each lamp.

After the solvent is removed the remaining solid is involatile at room temperature and the lamp can be exhausted and gas filled on a simple vacuum, gasfilling system of the type used for non-halogen lamps, without the need for cold traps or other devices for protecting rotary pumps, valve plates and other components.

Because all the iodine remains as an involatile solid during processing, no special maintenance or safety precautions are required on the exhaust and gasfilling system, and the method is very suitable for high speed production techniques.

The choice can be made as to whether iodine or hydrogen iodide is released. The involatile solids $CsAsI_6$ and $CsI_3$ liberate iodine on thermal dissociation, whereas the complex ammonium iodide $(CH_3)_4 NAsI_6$ (ratio H:I = 2.1) dissociates to hydrogen iodide.

Arsenic-containing compounds such as $CsAsI_6$ and $(CH_3)_4 NAsI_6$ possess the ability to remove residual impurities in the lamps in that the arsenic acts as a getter, and this permits less rigorous processing conditions for the lamps and components.

I claim:

1. In the method of making a tungsten halogen incandescent lamp which includes the steps of providing a lamp envelope, fitting a tungsten-filament and lead-in wires therefor into said lamp envelope, exhausting said envelope, filling said envelope with a gas and sealing said envelope, the improvement which comprises the steps of introducing iodine into the lamp envelope prior to said exhausting step, said iodine being introduced in the form of a complex iodide, which is an involatile solid at room temperature and decomposed or dissociated by heat, said iodide being selected from the group consisting of complex metal and complex ammonium iodides and being introduced into said envelope in solution in a volatile polar organic liquid, and removing said solvent to leave the solid complex iodide in said envelope.

2. The method of claim 1 in which the complex iodide is $CsAsI_6$.

3. The method of claim 1 in which the complex iodide is $CsI_3$.

4. The method of claim 1 in which the complex iodide is a quaternary ammonium hexaiodoarsenate selected from the group consisting of $(CH_3)_4 NAsI_6$ and $(C_2H_5)_4 NAsI_6$.

* * * * *